April 14, 1970  ISAMU MATSUI ET AL  3,506,209
AUTOMATIC COP SUPPLYING METHOD AND ITS APPARATUS
OF AUTOMATIC WINDING MACHINE
Filed Oct. 18, 1966  13 Sheets-Sheet 10

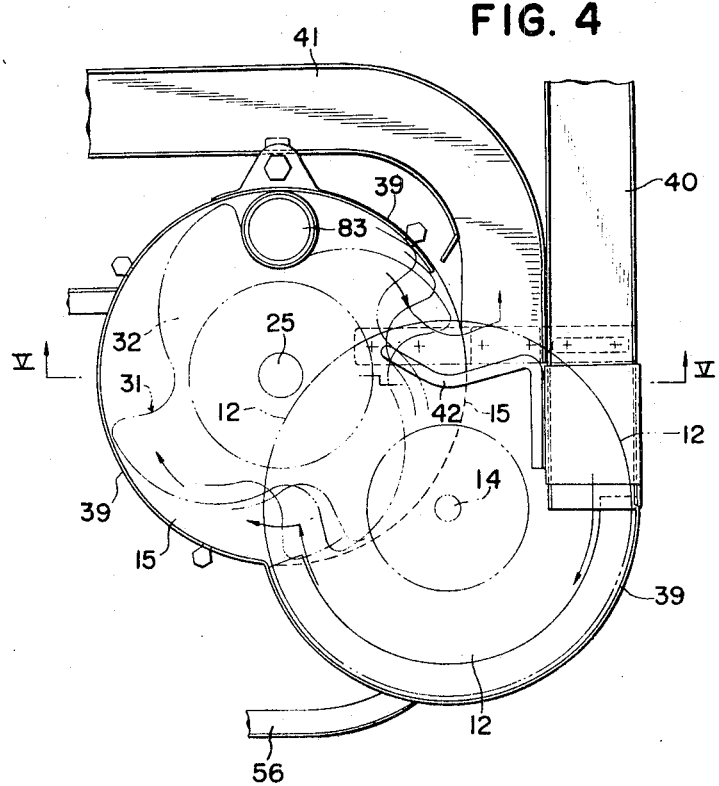
FIG. 4
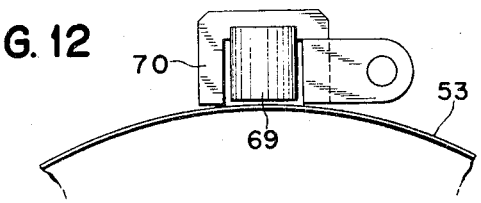
FIG. 12
FIG. 14
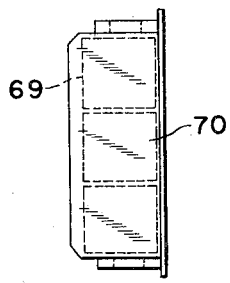
FIG. 13
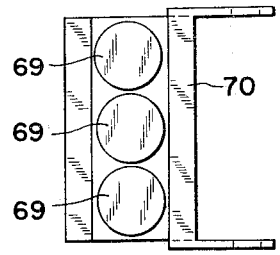

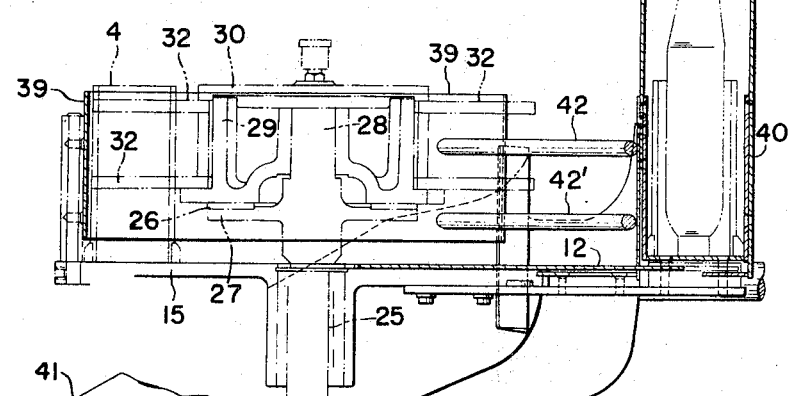
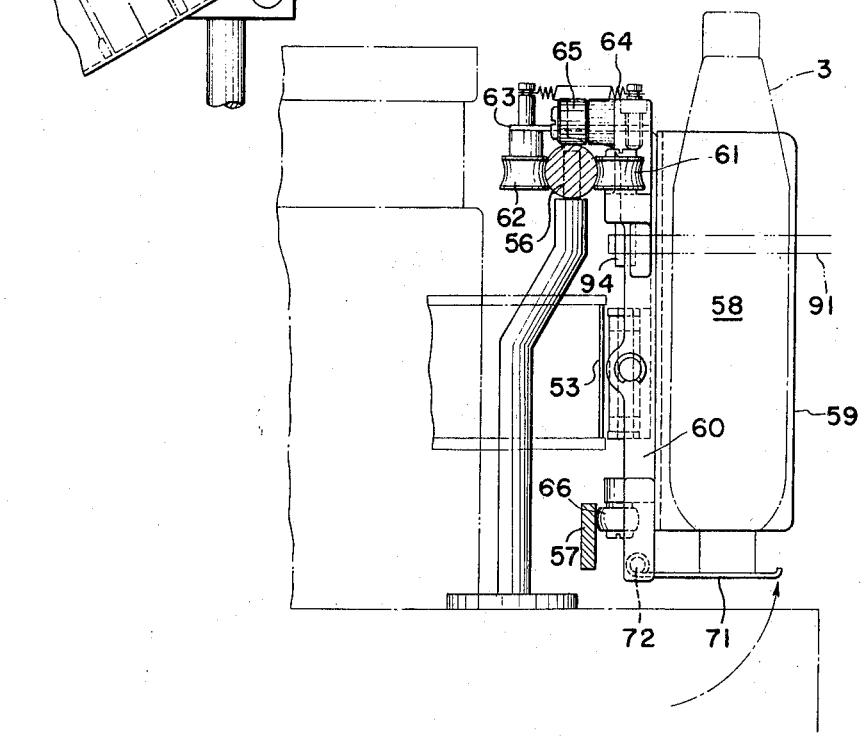

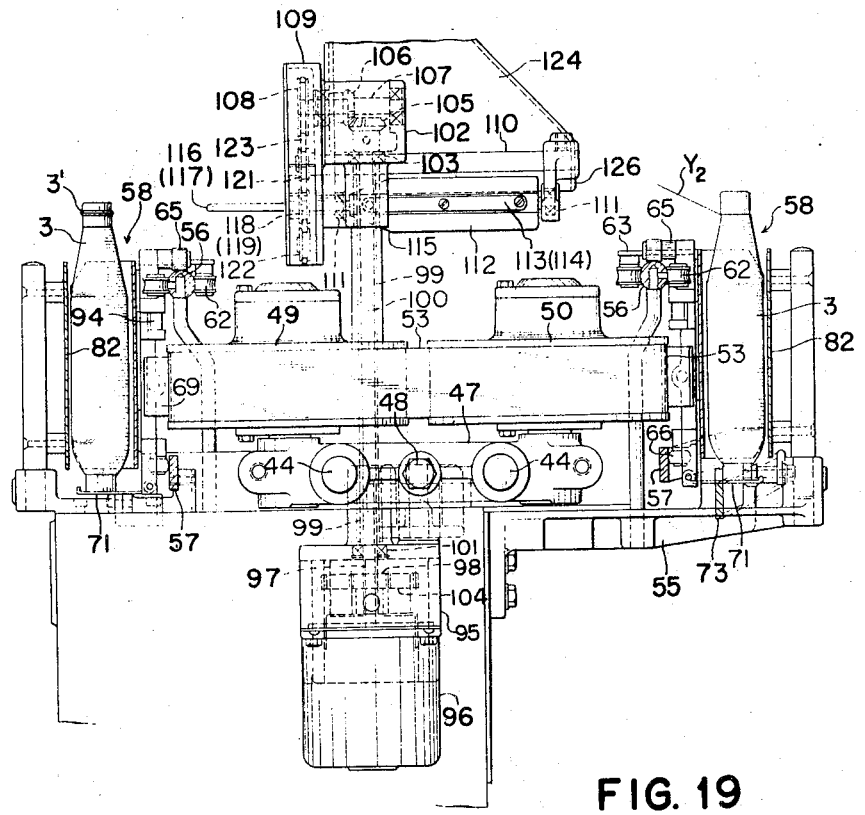
FIG. 15
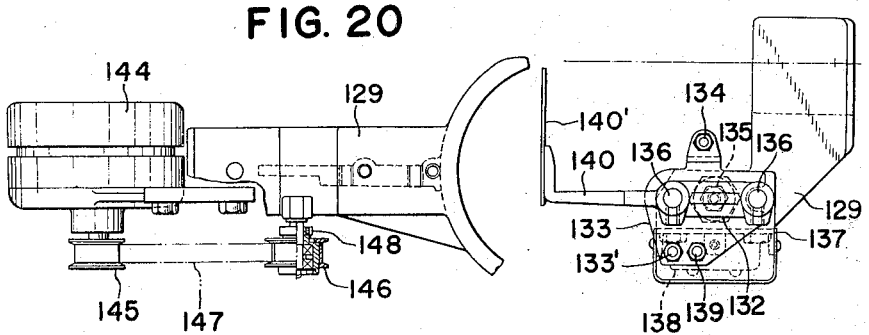
FIG. 20
FIG. 19

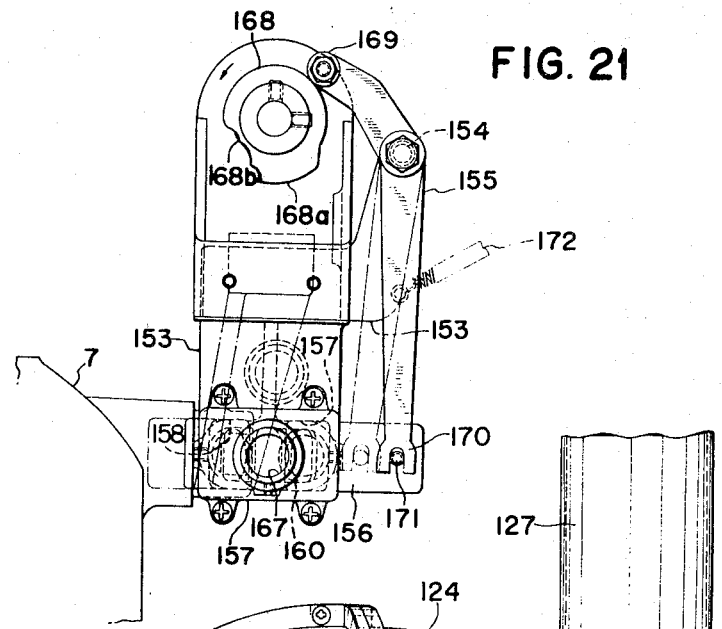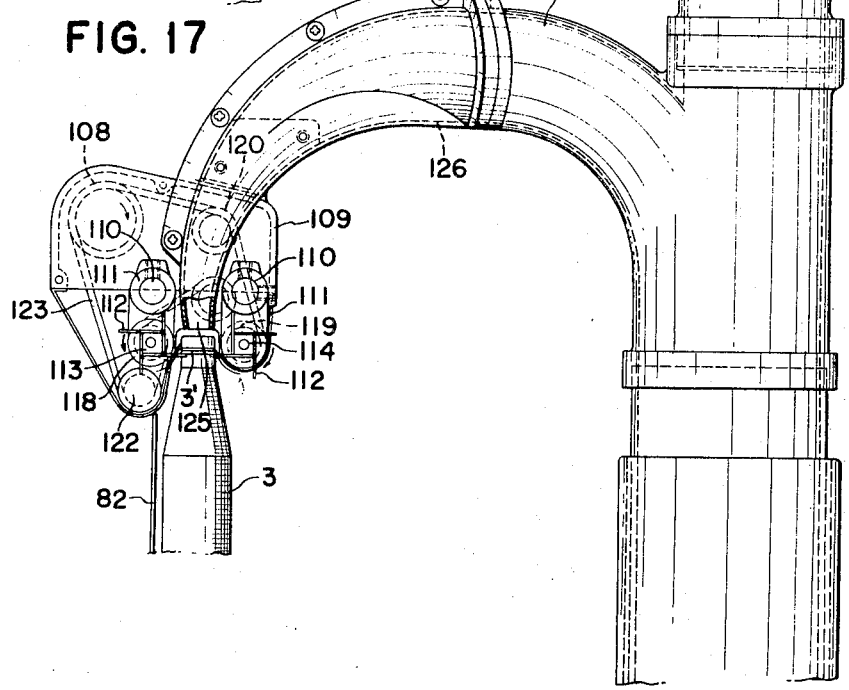

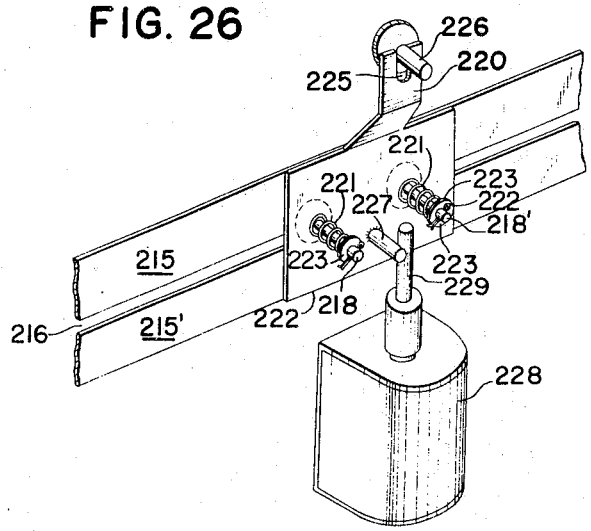
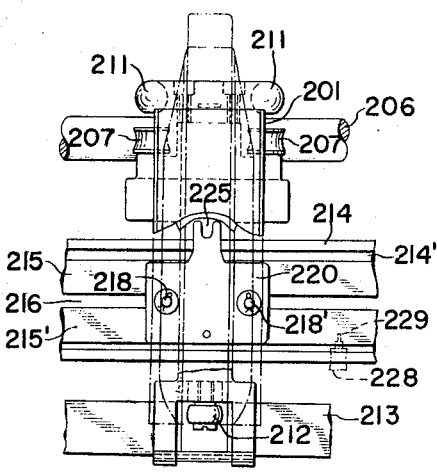
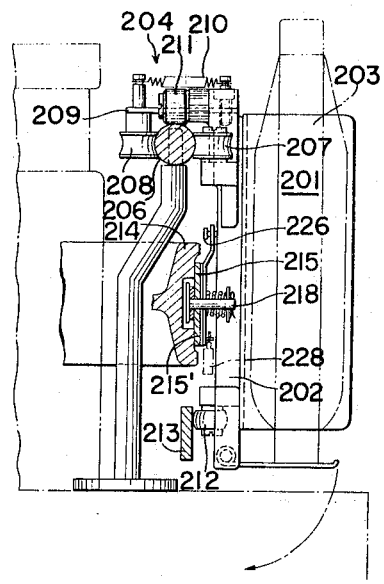

United States Patent Office 3,506,209
Patented Apr. 14, 1970

3,506,209
AUTOMATIC COP SUPPLYING METHOD AND ITS APPARATUS OF AUTOMATIC WINDING MACHINE
Isamu Matsui, Kyoto-shi, and Hiroshi Uchida, Kyoto-fu, Japan, assignors to Murata Kikai Kabushiki Kaisha, Kyoto-shi, Kyoto, Japan, a company of Japan
Filed Oct. 18, 1966, Ser. No. 587,542
Claims priority, application Japan, Oct. 20, 1965, 40/64,289; Nov. 27, 1965, 40/72,787; Feb. 22, 1966, 41/10,878
Int. Cl. B65h 54/24, 67/00
U.S. Cl. 242—35.5          19 Claims

ABSTRACT OF THE DISCLOSURE

The present invention relates to an automatic cop supplying method and corresponding apparatus which supplies cops, having a so-called tip bunch without back winding, to the respective winding units of an automatic winding machine automatically, and unites the yarn end of the supply cops with the end of the package of the respective winding units while transferring the cops to the winding units.

---

Generally, a cop produced by a spinnign machine has a so-called back winding (i.e., a terminal portion of yarn) wound around the fully packaged cop from the top portion to the bottom portioin of the cop with a coarse pitch and terminated with its end a tail end yarn wound around the bottom portion of the bobbin. Consequently, when the above-mentioned cops are supplied to an automatic winder, many preparatory operations, such as removing the tail end of the yarn from the bottom end portion of the bobbin or locating the back wound yarn and retrieving the yarn end of the cops by beating means, knot-tying the yarn end of the cops with the tail end of the yarn of the packages, mounted on the winder etc. Moreover, further preparatory operations such as carrying cops contained in boxes to an automatic feeder are necessary. In the case of some conventional cop feeders, cops held in containers are supplied on a horizontal feed lattice, and then carried upward by horizontal carriers, each of which carries a cop, position of the cops being changed to a vertical position by a rotary chute while they are being carried to a magazine of the automatic cop feeder. The complexity of mechanisms of such conventional automatic cop feeders makes them expensive and retards modernization of the winding process.

An object of the present invention is to provide an automatic cop supplying method and its apparatus for an automatic winding machine, which apparatus supplies cops having a so-called tip bunch without back winding to the respective winding units of the automatic winding machine automatically end unites the yarn end of the supply cops with the tail end of the yarn of the package of the respective winding units while transferring the cops to the winding units.

Another object of the present invention is to provide an automatic cop supplying method and its apparatus which carries cops in a vertically supported position without touching each other and supplies cops automatically to the automatic winder.

A further object of the present invention is to provide a compact apparatus for automatically supplying cops to winding units of an automatic winding machine, which does not require any auxiliary devices such as those used in the conventional automatic cop supplying apparatus, therefore obviating the necessity for a large space for the installation branch of such apparatus.

With the above and additional objects and advantages in view as will hereinafter appear, this invention comprises the devices, combinations, and arrangements of parts hereinafter described and illustrated in the accompanying drawings of preferred embodiment thereof.

FIG. 4 is a plan view of a portion of the cop carrying device of the present invention.

FIG. 5 is a sectional view of the cop carrying device, taken along line V—V of FIG. 4.

FIG. 8 is a plan view of the cop carrier for the present invention.

FIGS. 9 and 10 are elevational and side views respectively and partially in section of the carrier shown in FIG. 8.

FIG. 12 is a plan view of the magnet disposed on the cop carrier of the present invention.

FIGS. 13 and 14 are back and side views respectively, of the carrier shown in FIG. 12.

FIG. 15 is an elevational view, partially in section of the yarn retrieving device of the present invention as viewed in the XV direction in FIG. 2.

FIGS. 16 and 17 are plan view and side views respectively, partly in section, of the yarn retrieving device shown in FIG. 15.

FIGS. 19 and 20 are plan views of a portion of the knot-tier shown in FIG. 18.

FIGS. 21 and 22 are plan and side views respectively, of the snarl preventing device of the present invention.

FIG. 26 is a perspective view of another embodiment of a carrying means for a cop carrier of the present invention.

FIGS. 27, 28 and 29 are a fragmentary plan view elevational view and side view partially in section, respectively of the carrier shown in FIG. 26.

Figure 1:
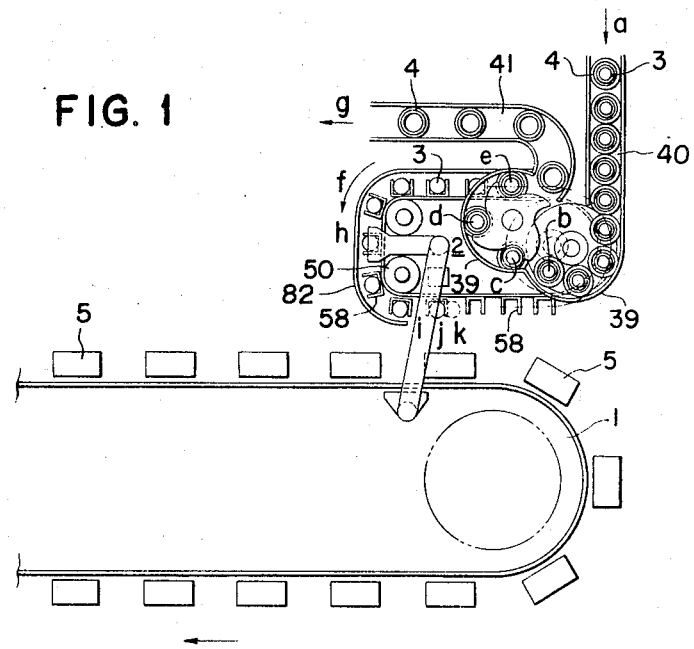
FIG. 1 is a drawing in schematic form for showing the relative positions of installation of the automatic cop supplying apparatus according to the present invention and the automatic winding machine.
Figure 7:
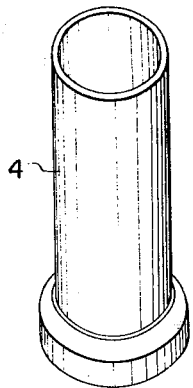
FIG. 7 is a perspective view of the cop container of the present invention.

According to the present invention, cops having a tip bunch without back winding are held in cop containers in the vertical position and carried to the automatic cop supplying apparatus of the invention and the containers are intermittently carried to a predetermined position one by one. The cops are then picked up automatically from the respective containers and transferred into the corresponding carriers which are moved in sequence in such a way that the carriers pass under the above-mentioned predetermined position while the empty containers from which the cops have been discharged are carried to the outside portion of the cop supplying apparatus. The tip bunch of each cop is loosened by the beating action of a beater disposed on the cop supplying apparatus while being carried by the carrier, and then the yarn end of each cop is united with the tail end of the yarn in the package of the corresponding winding unit by the automatic knot-tier which is disposed on the automatic winder. Finally the above-handled cops are supplied to the corresponding winding units of the automatic winder.

A detailed description of the automatic cop supplying method and its apparatus are set forth below.

GENERAL ARRANGEMENT OF THE COP SUPPLYING APPARATUS

Referring to FIGS. 1, 2, 3, 4, 6 and 7, an automatic cop supplying apparatus 2 is shown positioned to supply fully packaged cops to an automatic winder 1. Cops 3 produced by a spinning machine and having a tip bunch without back winding and supported in their respective containers 4 (referring to FIG. 7) are carried to the apparatus 2 from the direction shown by the arrow *a*. The cops 3 are transferred from the container 4 to the respective carriers of the apparatus 2 at the position shown by *e* and then supplied automatically to respective winding unit 5 of the automatic winder at the position *k* shown in FIG. 1.

Figure 2:
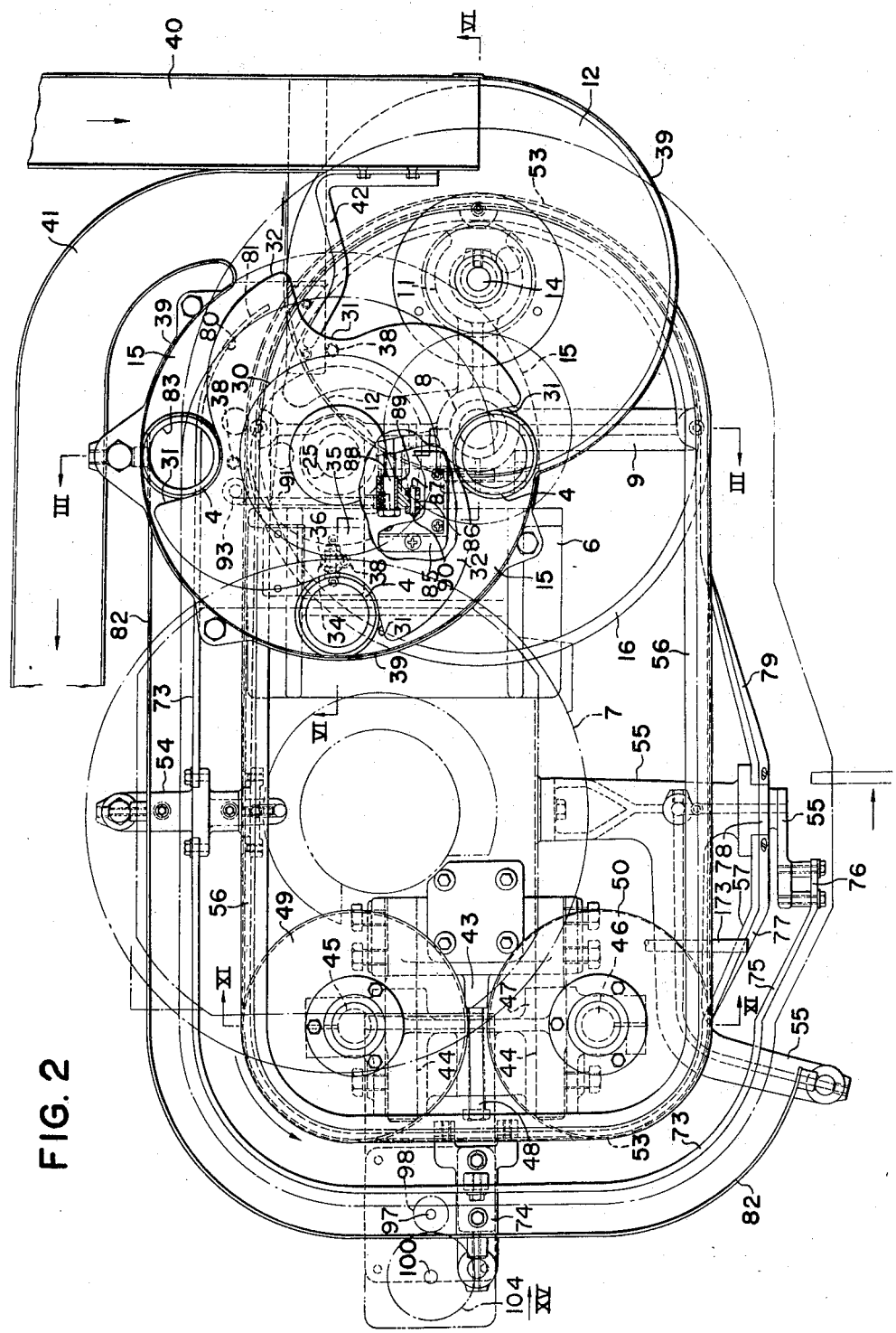
FIG. 2 is a plan view of the automatic cop supplying apparatus of FIG. 1.
Figure 3:
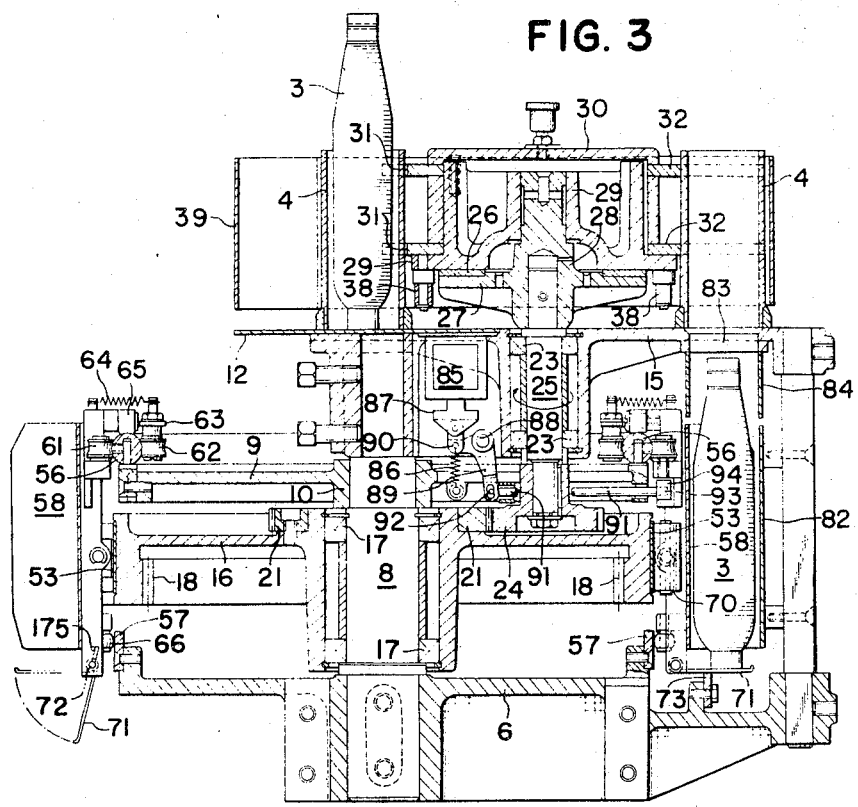
FIG. 3 is a vertical sectional view of the cop carrying device for conveying cop containers, taken along line III—III of FIG. 2.
Figure 6:
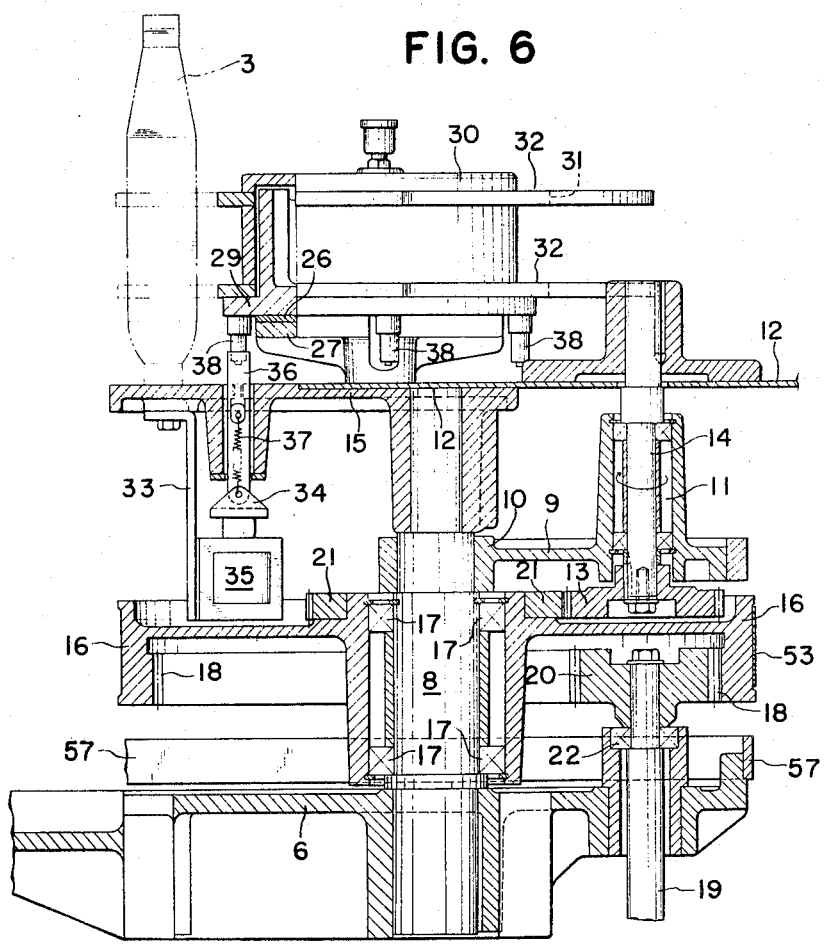
FIG. 6 is a sectional view of the driving means of the cop carrying device, taken along line VI—VI of FIG. 2.

As is clearly shown in FIGS. 2, 3 and 6, a bracket 6 is disposed on a suction box 7 and a central portion 10 of a semi-circular-shaped bracket 9 is secured to a vertical shaft 8. A bearing 11 is disposed on the right side portion of the bracket 9 (as seen in FIG. 6) and a vertical shaft 14 is rotatably supported by the bearing 11. A circular disc 12 for continuously carrying new cop containers 4 is secured to the top portion of the shaft 14 and a spur gear 13 is secured to the bottom portion of the shaft 14. A circular bottom plate 15 is secured to the top end portion of the vertical shaft 8 in such a way that the bottom is parallel with an in almost the same plane as the circular disc 12 and is positioned adjacent to the circular disc 12, as shown in FIG. 4. A pulley 16 is rotatably supported by the vertical shaft 8 through a bearing 17 between brackets 6 and 9. A spur gear 20 is secured to the top end portion of a rotation shaft 19 and meshes with an inner wheel 18 formed at the circumferential inner edge portion of the pulley 16, whereby a spur gear 21 secured to the boss of the pulley 16 meshes with the spur gear 13. The rotation shaft 19 is supported by the bracket 6 through a bearing 22, and is driven by a power transmission means through a gear train of bevel gears, a transverse shaft and vertical shafts (not shown), so as to rotate once for each passage of the winding unit 5.

Referring to FIG. 3, a bearing 23 is disposed at the central portion of the bottom plate 15, a rotation shaft 25 is supported by the bearing 23 and a spur gear 24 secured to the bottom end of the shaft 25 meshes with the spur gear 21. A boss 28 of a friction disc 27 to which a cork sheet 26 is attached on its upper surface is secured to the top end portion of the rotation shaft 25. A friction drive disc 29 is rotatably disposed on the upper portion of the boss 28 of the friction disc 27 in such a way that the friction drive disc 29 faces the cork sheet 26, so as to form a friction clutch by the abovementioned cork sheet 26, friction disc 27, boss 28 and friction drive disc 29. A pair of spaced cop-carrying plates 32 are secured to the upper and lower circumferential portions of a cover 30 disposed on the friction drive disc 29 and each carrying plate 32 is provided with four curved recesses or pockets 31 disposed at equal intervals around the periphery of the plate in such a way that each pair of aligned, spaced recesses 31 forms a pocket for carrying the cop containers 4. The cop carrying plates 32 can be rotated counterclockwise in a free condition by the friction disc 27 as shown in FIGS. 2 and 4.

Referring to FIG. 6, a supporting plate 33 is secured to a lower portion of the bottom plate 15 which in turn is secured to the vertical shaft 8. A solenoid 35 is disposed on the supporting plate 33 in such a way that a plunger 34 of the solenoid 35 extends upward and a stopper 36 is supported by the plunger 34 in such a way that the top portion of the stopper 36 passes through a portion of the bottom plate 15, the bottom end being connected to the plunger 34. A spring 37 pushes the stopper 36 so as to extend its top end portion above the bottom plate 15. Four rollers 38 are disposed on the lower surface of the friction drive disc 29 at equal intervals so that when one of the rollers 38 is engaged by the stopper 36 as shown in FIG. 6, the friction disc 27 slips with respect to the friction drive disc 29 and consequently the TOP carrying plates 32 stop.

Referring to FIGS. 4 and 5 a guide plate 39 is disposed around one half of the circumference of the TOP container carrying plate 12 and ⅔ of the circumference of the bottom plate 15. A guide conduit 40 having a U-shaped cross section is connected to the end portion of the guide plate 39 at the side of the circular plate 12 and the conduit 40 is connected to a transferring conveyor for the TOP container (not shown). Another conduit 41 is disposed at the end portion of the guide plate 39 at the side of the bottom plate 15 and is connected with a conveyor (not shown) to return empty TOP-containers 4 to the spinning room. A pair of curved guide rods 42 are horizontally disposed at the outlet of the empty TOP-containers.

Figure 9:
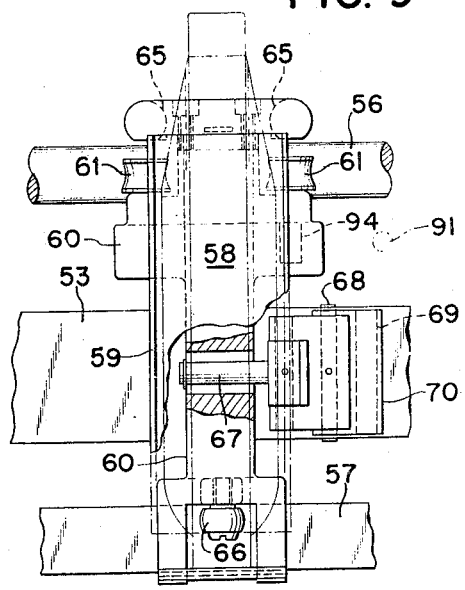
Figure 11:
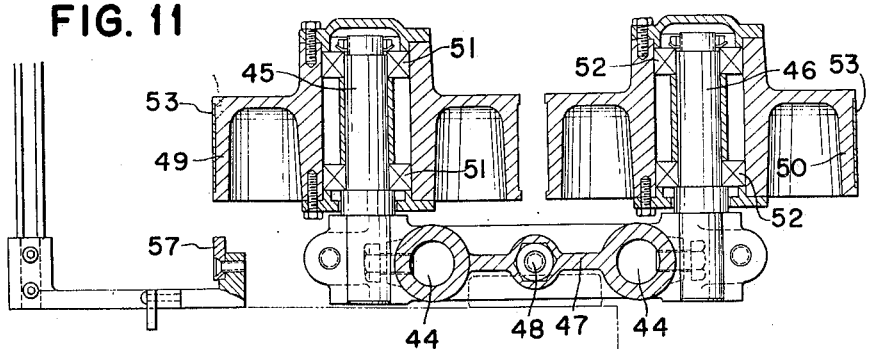
FIG. 11 is a vertical sectional side view of the driving pulley for driving the steel belt, taken along line XI—XI of FIG. 2.
Figure 16:
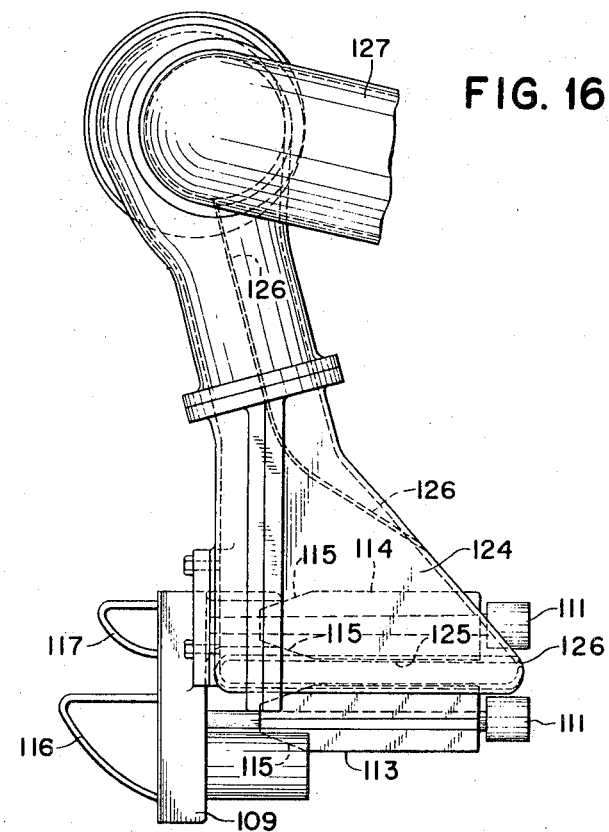

Referring to FIGS. 2 and 11, a bracket 43 is disposed on the suction box 7 in the opposite direction to the bracket 6 (the side in FIG. 2) supporting shafts 44 are transversely secured to the front and back ends of the bracket 43, and a bracket 47 having a pair of vertical shafts 45 and 46 secured to the front and back ends of it is supported by the supporting shafts 44 in such a way that the bracket 47 can slide freely in the right and left hand directions. An adjusting bolt 48 is screwed by one end to the bracket 43 and also screwed to the middle portion of the bracket 47 so as to move the bracket 47 in the left or right hand direction (FIG. 2) by turning the adjusting bolt 48 clockwise or counterclockwise. Small pulleys 49 and 50 are supported by the vertical shafts 45, 46 through bearings 51, and 52 and a thin steel belt 53 is driven by the counterclockwise direction of the pulley 16 when the pulley 16 is driven by the shaft 19. Brackets 54 and 55 are secured to the suction box 7 in such a way that the brackets 54 and 55 project from the suction box 7. A looped rail 56 having a circular section is supported horizontally by the upper end of the brackets 54 and 55 and a portion of the circumference of the bracket 9, and a looped rail 57 having a square section is supported by the lower end of the brackets 54 and 55 and a portion of the circumference of the bracket 6 in such a way that the looped rail 56 is superimposed upon the main portion of the looped rail 57 with a constant distance so as to form a guide rail for carrying a carrier 58 whose construction is shown in detail in FIGS. 8 and 9.

CARRYING MEANS FOR CONVEYING TOPS

Referring to FIGS. 8, 9, 10, 12, 13 and 14, the top carrier 58 comprises a top supporting member 59 vertically disposed at the front part of a bracket 60, a pair of guide rollers 61 having a shape corresponding to the looped rail 56 which are disposed symmetrically at the top portion of the bracket 60, and a roller 62 having the same shape as that of the rollers 61 and disposed at the back side of the looped rail 56 in such a way that the roller 62 is positioned at the apex of an imaginary, regular triangle formed by joining the three centers of the rollers 61, 61 and 62 as shown in FIG. 8. A supporting arm 63 for supporting the roller 62 is always pulled in the right hand direction (FIG. 10) by a spring 64 which is connected at its end with the bracket 60 so as to press the rollers 61, 61 and 62 against the looped rail 56. A TOP supporting member 59 is provided with a U shaped cross section as clearly shown in FIG. 8. Rollers 65 are disposed symmetrically to both the TOP end portion of the bracket 60 in such a way that the rollers 65 ride on the looped rail 56, thereby the rollers 61, 61, 62 and 65 run on the looped rail 56. A roller 66 disposed at the lower end portion of the bracket 60 in such a way that the roller 66 faces the front portion of the looped rail 57, whereby the TOP carrier 58 is supported on the looped rails 56 and 57. A branch arm 67 is disposed transversely to the bracket 60 of the TOP carrier 58 and a magnet bracket 70 containing a permanent magnet 69 is pivotably supported by a pin 68 inserted in the top portion of the branch arm 67 so as to attract the permanent magnet 69 to the steel belt 53, whereby the TOP carrier 58 is carried positively counterclockwise by the rotation of the steel belt 53. Each TOP carrier 58 is provided with a trap door 71 disposed at the bottom portion of the TOP supporting member 59 in such a way that the trap door 71 is hinged at its base portion to a lower portion 72 of the bracket 60. The trap door 71 opens downward by gravity as shown in FIG. 3, when the opening of the trap door 71 is not restricted by a stopping means disposed under the door 71. A trap door guide rail 73 is supported by the brackets 6, 54, 55 and a bracket 74 in such a way that the guide rail 73 is disposed almost halfway along the looped rail 57 in a position outside of looped rail 57 with a constant spacing. A starting end of the guide rail is positioned adjacent to the looped rail 57 and is gradually turned outwardly from the looped rail 57, and further, the guide rail 73 is turned outwardly at a position adjacent to the position designated by *j* in FIG. 1 in such a way that the guide rail 73 is turned obliquely toward the outside at its portion 75. The terminal portion 76 of the guide rail 73 is supported parallel to the looped rail 56 as shown in FIG. 2. A starting portion 80 of the guide rail 73 is provided with a cam surface 81 which becomes gradually lower in height towards its end portion. On the other hand, the portion 77 of the looped rail 57, facing the portion 75 of the guide rail 73, is also angled outwardly as to keep it parallel to the portion 75 of the guide rail 73, and the portion 78 of the looped rail 57 is positioned parallel to the portion 76 of the guide rail 73. The looped rail 57 angles away from the looped rail 56 at one point to extend parallel with the looped rail 57 for a distance including a portion 79 as shown in FIG. 2.

A side wall 82 is disposed along the looped rails 56 and 57 between the *e* position and the *j* position shown in FIG. 1, in such a way that the distance between the cops 3 supported by the cop carrier 58 and hte side wall 82 is close, but do not bring the cops 3 and the side wall 82 into contact with one another. A circular exit aperture 83 for the cops 3 is formed in the bottom plate 15 which is positioned in the *e* position in FIG. 1, the inner diameter of the exit aperture 83 leaving the same dimension as the inner diameter of the cop carrier 4. A supplementary conduit 84 is positioned immediately below and aligned with the cop exit aperture 83 so as to provide a cop conduit between the bottom plate 15 and the top surface of the cop suporting mmeber 59.

A solenoid 85 is positioned beneath the bottom surface of the bottom plate 15 and a spring 86 provides for the return motion of a plunger 87 for the solenoid 85. A horizontal portion of a bell crank lever 89, pivoted on the lower portion of the bottom plate 15, is pivotably connected at 90 to the plunger 87. The other end of the bell crank lever 89 is connected to a base portion 92 of a stopper 91 which is slidably supported by a semicirular bracket 9, so it can slide freely in the forward and backward directions (in FIG. 2, in the upward and downward directions; in FIG. 3, in the left hand and right hand directions) whereby, when the solenoid 85 is not energized, an end portion 93 of the stopper 91 is projected outwardly from the outside portion of the semicircular bracket towards 9, the path of the cop carrier 58, so as to engage a roller 94 mounted on the same shaft that supports the roller 61.

Another embodiment of a carrying means for the cop carrier according to the invention is described in FIGS. 26, 27, 28, 29 and 30. In the drawings, each carrier 201 comprised a bracket 202 and a cop support 203 having a U-shaped cross section disposed on the front portion of the bracket 202, a group of rollers 204, for guiding the carrier 201, at the upper portion of the bracket 202, and a connecting mechanism 205 mounted on the middle portion of the bracket 202. A pair of rollers 207 and 207' shaped to fit the curvature of one engage (FIG. 29) an upper looped rail 206 are positioned symmetrically with respect to the right-hand and left-hand sides of the rail 206 and also to the upper portion of the bracket 202. A roller 208 having the same shape as that of the rollers 207 and 207' is disposed behind the looped rail 206 in such a way that the roller 208 is positioned at the apex of an isosceles triangle (FIG. 27) while the other two points of the triangle coincide with the rotating center of the rollers 207 and 207'. The group of rollers 204 comprises the above-mentioned three rollers 207, 207' and 208. An end of a spring 210 is connected to the bracket 202 so as to pull an arm 209 supporting the roller 208 in the right hand direction as shown in FIG. 29. Then, the rollers 207, 207' and 208 contact the front surface and back surface of the looped rail 206 respectively. A pair of rollers 211 is positioned at the top portion of the bracket 202, one on the right hand and one on the left hand (FIG. 27) side of the bracket 202 in such a way that the rollers 211 ride on the looped rail 206. A roller 212 is disposed at the lower end portion of the bracket 202 so as to face the front portion of a lower looped rail 213, whereby, each cop carrier 201 is supported by the upper and lower looped rails 206 and 213. A pulley 214 supports two steel belts 215 and 215' for carrying the cop carrier in its groove 214'. A pair of pins 218 and 218' having a pair of connecting pieces 217 and 217' is inserted in a space between the two steel belts 215 and 215', and a piece of nylon sheet 219 and a guide lever 220 are connected to the pins 218 and 218' through the steel belts 215 and 215' and the nylon sheet 219. A spring 221 is mounted on each pin 218 (218') between a washer 223, mounted on the pin 218, 218" and held there by a pin 222, and the guide lever 220, whereby in the normal condition, the guide lever 220 is carried by the steel belt 215 and 215' together with the pins 218 and 218'. A thin steel belt 224 is positioned between the nylon sheet 219 and the guide lever 220, is adapted to follow the contours of the steel belts 215 and 215'. A groove 225 is formed in the top end portion of the guide lever 220 and a pin 226 mounted to the back portion of the bracket 2—2 is received by the groove 225. A stop pin 227 is secured to the lower section of the guide lever 220 and is adapted to engage with a projection piece 220 of a solenoid 228 when the solenoid is actuated to stop the carrier 201. Thus, the steel belts 215 and 215' are driven when the pulley 214 is rotated. The guide lever 220 is carried by the steel belts 215 and 215' as the guide lever 220 and the connecting piece 217 engage the steel belts 215 and 215' due to the bias exerted by the spring 221. The bracket 202 of the carrier 201 is carried by a pin 226 received by the groove 225 disposed on the upper end portion of the guide lever 220. The carrier 201 is carried in such a way that the group of rollers 204 disposed on the upper portion of the bracket 202 is engaged with the upper looped rail 206, and the roller 212 is engaged with the looped rail 213. Thus, the carriers 201 are moved by the steel belts 215 and 215' under the conditions described immediately above. When it is necessary to stop the carrier 201 the pin 227 disposed on the lower portion of the guide lever 220 is engaged by the projection piece 229 of the solenoid 228 when the solenoid 228 is activated. When this occurs the guide lever 220 is stopped adjacent to the solenoid 228 thereby opposing the driving motion of the steel belts 215 and 215', even though there is some frictional contact between the steel belts 215 and 215' and the nylon sheet 219. When the stop pin 227 and the projection piece 229 are disengaged by the deactivation of the solenoid 228, the slippage between the guide 220 and the steel belts 215 and 215' is eliminated and the steel belts 215 and 215'. The above-mentioned motion of the projection piece 229 can be operated by other means, such as a cam mechanism. As described in both embodiments, the carriers 201 can be stopped individually at a predetermined position when desired while the steel belts continue to move.

YARN RETRIEVING MEANS

Figure 24:
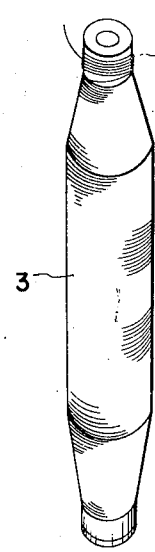
FIG. 24 is a perspective view of the cops utilized in the present invention, having a tip bunch without a back winding.
Figure 25:
FIG. 25 is a perspective view of the cop utilized in the present invention, having a back winding and a tail yarn wound around the bobbin.
Figure 27:
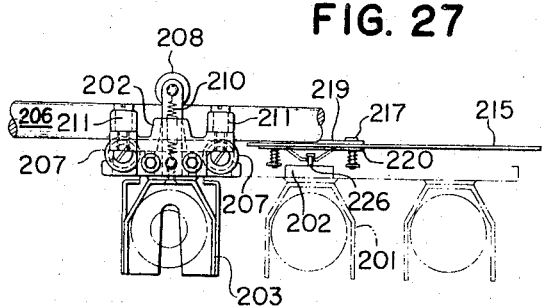

The yarn retrieving means of the present invention is particularly designed for a cop 3 having a so-called tip bunch 3' without a back winding as shown in FIG. 24, not for cop having a back winding as shown in FIG. 25. Referring to FIGS. 15, 16 and 17, 24 and 25, a motor bracket 95 is mounted on the suction box 7 and a pinion 98 is secured to a shaft 97 of a motor 96 supported by the bracket 95. A hollow support 99 is disposed vertically with respect to the motor bracket 95, and a shaft 100 passing through the hollow support 99 is supported by a rotatable bearing 101, mounted on the motor bracket 95 and a bearing 103 mounted on a gear box 102 positioned at the top end portion of the hollow support 99. A reduction gear 104 is secured to the bottom end portion of the shaft 100 and meshes with the pinion 98. A bevel gear 105 is fixed to the top end portion of the shaft 100, and a pulley 108 is secured to an end of a rotatable shaft 107 to which is secured a bevel gear 106 that meshes with the bevel gear 105.

A pulley box 109 is secured to the side surface of the gear box 102 and a pair of bearings 111, 111' are secured to a stay shaft 110 which is secured parallel to, and spaced from the pulley box 109. Beaters 113 and 114 are supported in a horizontal plane by the bearings 111 and 111' and each is provided with four blades 112 made of polyurethane resin which project radially of the shafts of the beaters 113 and 114 so as to pass adjacent the tip bunch portion of the cop 3 on two sides of the big bunch as seen more clearly in FIG. 17. An end portion of the blade 112 is in the cop entrance side cut as shown by the angles portions 115, so as to provide easy entrance of the cops between the beaters 113 and 114. Guide wires 116 and 117 are disposed on the cop entrance side of the pulley box 109 so that the top portion of the cops is led between the beaters 113 and 114.

Pulleys 118 and 119 are secured to the beater shafts, and the pulleys 108, 120, 121 and 122 are mounted in the pulley box 109. The endless belt 123 is wound around the pulleys 118 119, 120, 121 and 122 and the main pulley 108. Thus, the rotation of the motor shaft 97 is transmitted to the beaters 113 and 114 through the reduction gear 104, the shaft 100, the bevel gears 105 and 106, the pulleys 108, 118, 119, 120 and 122, etc., so as to rotate the beaters 113 and 114 in the direction of the arrows shown in FIG. 17.

A suction pipe 124 is positioned in such a way that a downwardly extending fluidly connected pipe 124 is disposed close to the tip bunch 3' between the beater 113 and 114. A slit 126 for removing yarn is formed from the end portion to the base portion of the suction pipe 124 (referring to FIGS. 15 and 16). A suction pipe 127 for retrieving the yarn end of a cheese or cone is fluidly connected to the suction pipe 124.

Figure 31:
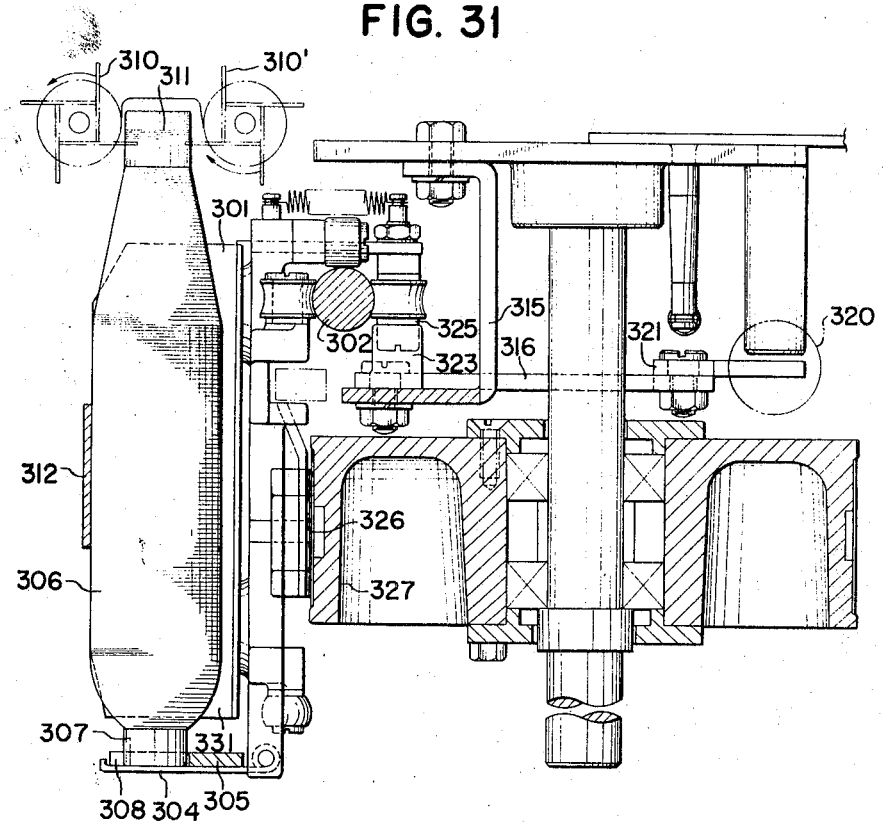
FIG. 31 is a side view partially in section of another embodiment of the present invention showing means for loosening the tip bunch of cops.
Figure 30:
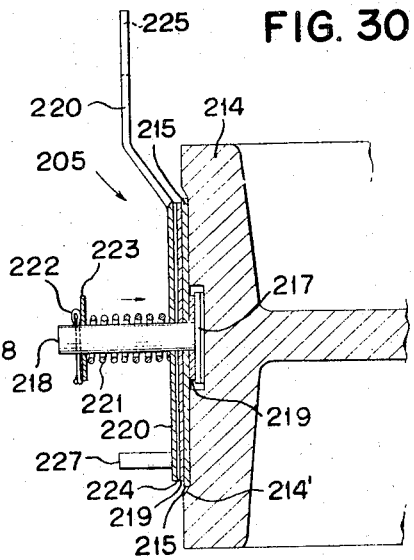
FIG. 30 is an enlarged view partially in section of the supporting means for the carrier shown in FIG. 26.
Figure 32:
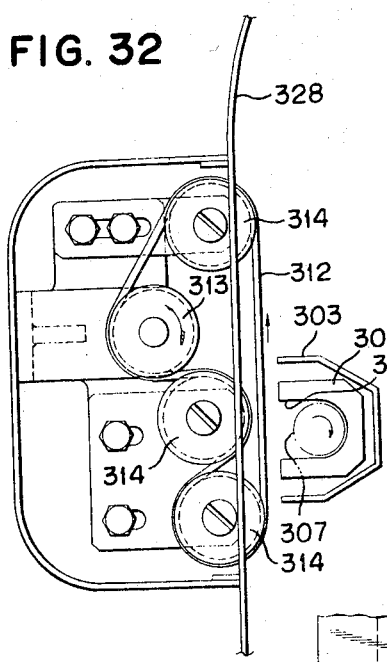
FIG. 32 is a plan view of a driving means for rotating the cop of the embodiment shown in FIG. 31.
Figure 33:
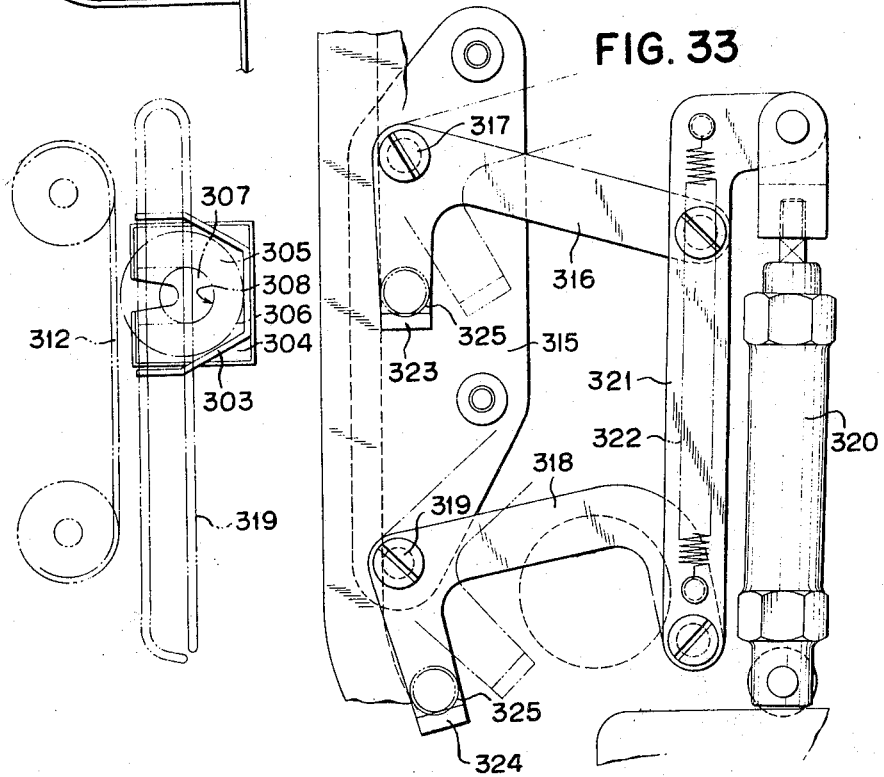
FIG. 33 is a carrying means for the embodiment shown in FIG. 31.

The other embodiment for loosening the tip bunch of the cop is described in FIGS. 31, 32 and 33. In the drawings, a cop carrier 301 is carried along a looped rail 302, and the cop receiving portion of the carrier 301 comprises a pair of side plates for forming a cop supporting member 303 and a bottom plate 304 for closing the bottom opening of the cop supporting member 303 and for receiving the cop, as described in the first embodiment of the invention. A cop receiving plate 305 made of nylon is mounted on the bottom plate 304 and has formed therein, a U-shaped aperture 308 having the same width as the diameter of the bottom portion of a bobbin 307 of a cop 306. The U-shaped aperture 308 opens in such a way that the opening of the aperture 308 faces outwardly (left hand direction in FIG. 31), so as to prevent undesirable movement of the bottom portion 307 of the cop 306. A nozzle is disposed at the working position for retrieving the yarn end of the cop 306 and a pair of beaters 310 and 310' are disposed under the opening of the nozzle in such a way that the head portion of the cop 306 is carried to a position between the beaters 301 and 301' so as to open a tip bunch 311 positively. Further, an endless belt 312 rotating in the direction shown by an arrow in FIG. 32 is disposed in the operating position for an retrieving yarn end from the cop 306 in such a way that the endless belt 312 is positioned at the front side of the cop carrier 301 as to contact the cop 306 rotate the cop in the unwinding direction. Thus, the cops are carried to the belt 312 by the carriers 301 and are rotated positively by the frictional contact with the endless belt 312. The endless belt 312 is driven by a power transmitting means (not shown) through a driving pulley 313, and a guide pulley 314. A bracket 315 is disposed at the opposite side of the cop from that of the endless belt 312 (FIG. 31). An L-shaped lever 316 is pivotally mounted on the bracket 315 by a pin 317 at the entrance side of the carriers 301 and a U-shaped lever 318 is pivotally mounted on the bracket 315 by a pin 319 at the outlet of the carriers 301 one end of each of the levers 316 and 318 being connected by a connecting rod 321 which can be slid in the right hand direction (downward direction in FIG. 33) by an air cylinder 320. In a normal condition, the levers 316 and 318 are urged to turn in a counterclockwise direction by a spring 322 connected to the rod 321 to the dotted line position shown in FIG. 33. When the air cylinder 320 is actuated the levers 316 and 318, into engagement with rollers 325 disposed at the back portions of the cop carrier 301.

As shown in FIG. 31, a drive wheel 327 drives a steel belt 326 that carries the cop carrier 301, and a side wall 328 (FIG. 32) is disposed along the passage of the cop carrier 301 at the outside portion of the passage.

When the cop 306 supported by the carrier 301, arrives at the apparatus for loosening the tip bunch the bottom end portion 307 is received by the U-shaped aperture 308 of the cop receiving plate 305 and the head portion is supported between beaters 310 and 310'. Thus, the centripetal force applied to the cop 306 by the motion of the carrier 301 does not move the cop 306 which is held in a steady supporting condition. Consequently, when the endless belt 312 rotates in the direction shown by the pertinent arrow in FIG. 32, the aperture 308 and the beaters 310 and 310' function as bearings for the rotation of the cop 306 and the cop 306 starts to rotate in the unwinding direction (clockwise direction in FIG. 32) as a result of the functional engagement between the cop surface and the endless belt 312.

As the beaters 310 and 310' rotate positively in the direction shown by the pertinent arrow in FIG. 32, the beaters 310 and 310' loosen the tip bunch 311, while the cop 306 is rotating in the unwinding direction and the loosening operation of the tip bunch is accelerated, whereupon the loosened and opened yarn end is sucked into the mouth of the suction nozzle which faces the head portion of the cop 306. As the L-shaped lever 316 is pivotally mounted on the front portion of the bracket 315 facing the endless belt 312, when the L-shaped lever 316 turns to the position shown by the solid line in FIG. 33 by the actuation of the air cylinder 320, the stop piece 323 disposed at the top portion of the lever 316 engages the roller 325 mounted on the back portion of the carrier 301. Consequently the cop carrier 301 is stopped and the cop 306 supported by the carrier 301 is rotated by the endless belt 312 at the stationary position, and the tip bunch of the cop 306 is simultaneously loosened by the beaters 310 and 310'.

The other lever 318 which acts with the lever 316 functions to synchronize the carrier 301 with the winding unit, that is, the carrier 301 after the yarn retrieving motion has been completely stopped for a while by the lever 318 so as to allow a knot-tying operation between the yarn end of the cop 306 and the yarn end of the package of the winding unit. The operation for supplying a new cop to the corresponding winding unit follows after the knot-tying operation.

KNOT-TIER

Figure 18:
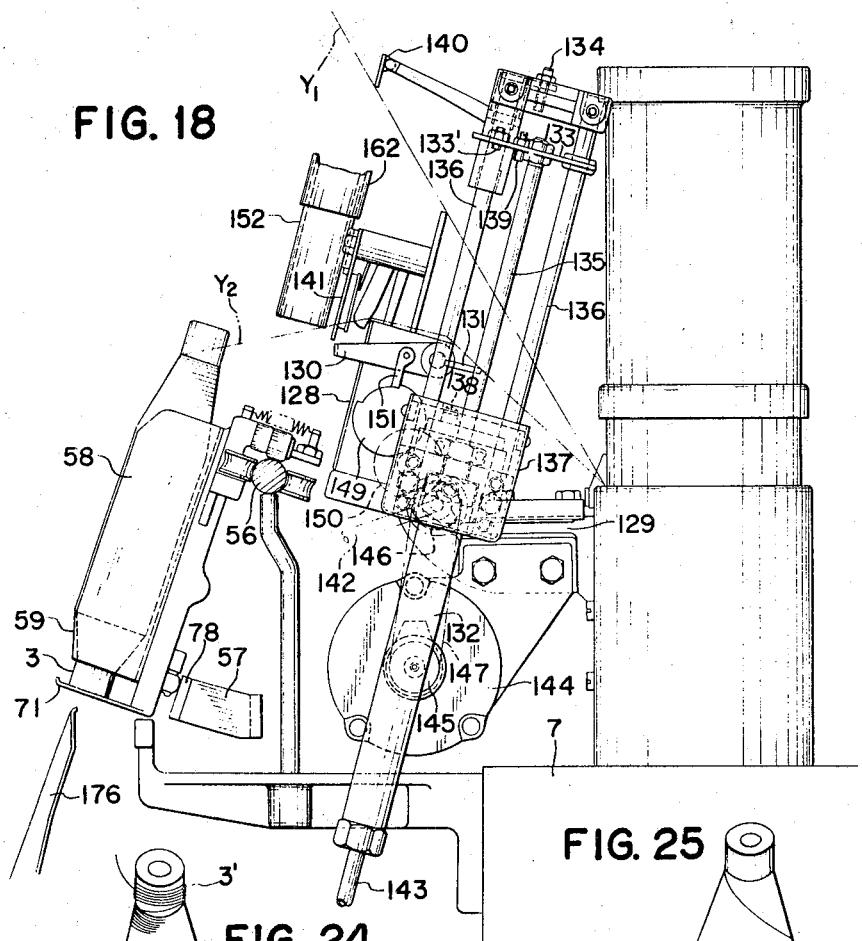
FIG. 18 is a side elevational view of the knot-tier of the present invention.

Referring to FIGS. 18, 19 and 20 a knot-tier is disposed on the front portion of the bracket 129 while extending beyond the suction box 7. A rearwardly extending knot-trip lever 131 is disposed on a clamp lever 130, in such a way that the knot-trip lever 131 faces a pin 134 for operating the knot-trip lever 131 which is downwardly screw-fitted to a lifting plate 133 which rises and falls by the action of an air-cylinder 132 adjacent the knot-tier 128. A piston rod 135 of the air cylinder 132 is secured to the lifting plate 133 at its top end portion. A guide rod 136 guides the lifting motion of the lifting plate 133, and a set screw 133' is disposed on the under surface of the lifting plate 133 in such a way that the screw 133' faces the upper surface of the guide rod bracket 137 so as to limit the lowest position of the lifting plate 133. Therefore, the position of the set screw can be adjusted to change the length of the stroke of the lifting plate 133. A limit switch 138 is disposed on the bracket 137 and when the limit switch 138 is closed by the engagement of an operating pin 139 of the lifting plate 138, a magnetic valve (not shown) is actuated so as to return the piston rod 135 of the air cylinder 132 to its elevated position.

A projecting yarn guide 140 is disposed on the front portion of the lifting plate 133. At the top end portion of the yarn guide a hooked portion 140' is formed parallel with the path of the cop carrier 58, whereby when the yarn guide 140 moves downwardly following the downward motion of the lifting plate 138, a yarn end $Y_1$ of the package which was previously led to the hooked portion 140' is led to the intermediate portion between the clamp lever 130 and an up-down plate 141, and then led to a knotter-bill (not shown) together with yarn end $Y_2$ of the cop 3. Air pipes 142 and 143 are connected with the upper portion and lower portion of the air cylinder 132, whereby, while the knot-tier 128 is operating a magnetic valve is opened by the controlling action of a limit switch (not shown) which is actuated by a cam secured to the vertical shaft 19 so as to supply air from the supply air pipe 142 to the air cylinder 132, while on the other hand, air contained in the air cylinder 132 is discharged through the discharge air pipe 143. Immediately after completion of the knot-tying operation, the air flow in pipes 142 and 143 are reversed by the operation of the magnetic valve by the limit switch 138. A pulley 145 is secured to a knotter motor 144, and a pulley 146 is disposed on the bracket 139. A timing belt 147 is mounted on the pulleys 145 and 146 and a pinion 148 is secured to the shaft of the pulley 146. A gear 150 meshes with the pinion 148 and a pinion (not shown) is secured to a shaft of a clutch wheel 149 and a stopper 151 depends from the clamp lever 130 and faces the clutch wheel 149 so that, when the stopper 151 leaves the cut portion of the clutch wheel 149, the rotation of the knotter motor 144 which is normally rotating is transmitted to the knot-tier 128.

Figure 22:
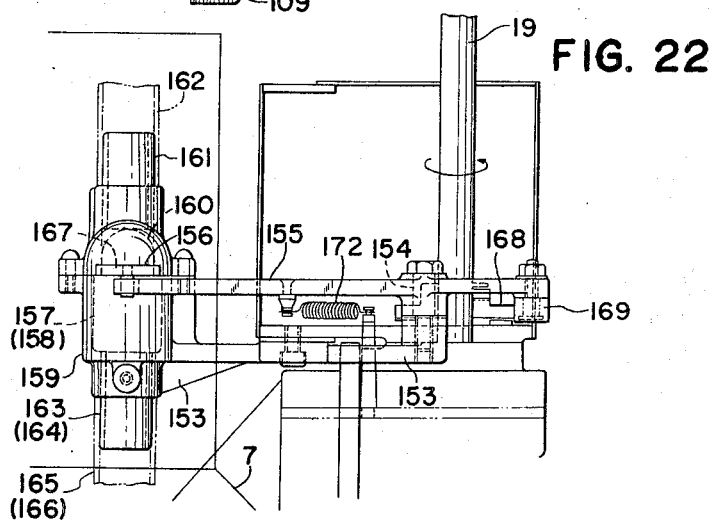
Figure 23:
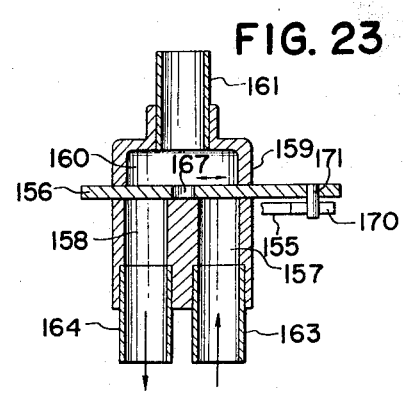
FIG. 23 is a longitudinal sectional view of the snarl preventing device shown in FIGS. 21 and 22.

A snarl preventing nozzle 152 for preventing snarling of yarn and for discharging yarn waste is disposed downwardly on the front portion of the up-down plate 141 in a normally open condition, and is provided with the following function by a control mechanism hereinafter described. The nozzle 152 sucks air while the knot-tier 128 is working and just before and after the operation of the knot-tier, discharges air after bobbin chuting for a predetermined time. Referring to FIGS. 21, 22 and 23 a projecting bracket 153 is disposed on the suction box 7 and a pin 154 pivotally supporting a horizontal curved lever 155 is disposed vertically on an end portion of the bracket 153. An air-adjusting unit 159 comprising an air supply compartment 157 and an air discharge compartment 158 is disposed at the other end portion of the bracket 153 in such a way that the openings of the air supply compartment 157 and air discharge compartment 158 are alternately closed by a shutter plate 156 which can be slid by the turning motion of the lever 155. As shown in FIG. 23, the air adjusting unit 159 comprises the air supply compartment 157 and the air discharge compartment 158 disposed adjacent to the air supply compartment 157 and a compartment 160 disposed adjacent the upper position of the compartments 157 and 158 in such a way that the shutter plate 156 is intermittently disposed between the compartment 160 and the other two compartments so as to provide a connection between the compartment 160 and the other two compartments 157 and 158. A pipe 161 disposed on the compartment 160 extends upwardly and is flexible, connected to the nozzle 152 by a flexible tube 161 and is utilized for preventing snarling of the yarn. The pipes 163 and 164 are fluidly connected to the compartment 157 and 158, respectively, the compartment 157 being connected with a discharge outlet of a blower by a flexible pipe 165 and the compartment 158 being with the suction side of the blower by a flexible pipe 166 (FIG. 22). An aperture 167 is disposed on the shutter plate 156, whereby when the lever 155 is placed at the position shown by solid lines in FIG. 21, the aperture 167 is placed at the intermediate position between the compartment 157 and 158. Consequently the shutter plate 156 interrupts the connection between the compartment 160 and both the compartments 157 and 158, respectively; on the other hand, when the lever 155 is turned counterclockwise in FIG. 21, the aperture 167 of the shutter plate 156 coincides with the compartment 157, that is, the connection between the compartment 158 and the compartment 160 is closed. When the lever 155 turns clockwise in FIG. 21, the reverse effects are obtained. A cam 168 is disposed on a rotation shaft 19 (FIG. 6) which rotates once with each passage of the winding unit 5 and a roller 169 disposed at the top end portion of the short arm of the lever 155 contacts the cam 168, whereby when the cam 168 rotates counterclockwise (in FIG. 21) the shutter plate 156 is moved toward the left and the large diametrical portion 168a actuates the roller 169. On the other hand, when the small diametrical portion 168b of the cam 168 actuates the roller 169, the shutter plate 156 is moved toward the right (FIG. 21). A forked portion 170 formed at the end portion of the long arm of the lever 155 engages a pin 171 secured to the shutter plate 156, so as to transfer its motion to the shutter plate 156. A spring 172 connected to the lever 155 always presses the roller 169 against the cam 168.

CONTROL MEANS FOR TRANSFERRING COPS FROM CARRIERS TO WINDING UNITS

Referring to FIGS. 2, 3 and 18 a stopper 173 having the same function and construction as the stopper 91 shown in FIG. 3 is disposed under the looped rail 56 at a position adjacent to the chute position of the cops ("position *j*" in FIG. 1) as shown in FIG. 2 in such a way that the stopper 173 can move forward and backward. The mechanism for providing the stopper 173 with forward and backward movement is almost the same as the mechanism that included the solenoid 86 and the stopper 91 and their related members as shown in FIG. 3. Thus, the stopper 173 is moved to a projected position relatively to the looped rail 56 once for each passage of the winding unit 5, whereby the cop carrier 58 is provided with the same relative speed as the transferring speed of the winding unit 5, that is, the relative transferring speed between the cop carrier 58 and the winding unit 5 becomes approximately zero. A stopper not shown for stopping the cop carrier 58 is secured to the upright portion of the winding unit 5 catches a side of the cop supporting member 59 of the cop carrier 58 which is maintained in an inclined position by a curved portion 77 and a parallel portion 78 of the looped rail 57. A stop pin 175 (FIG. 3) is disposed on the cop carrier 58 so as to stop the opening of the trap door 71 while the carriers 58 are carried along the looped rail 57 till the carriers 58 come to the chute position *j* shown in FIG. 1 for supporting cops is disposed on each winding unit in a relatively inclined position shown in FIG. 18.

CONTROL MEANS FOR TRANSFERRING COPS INTO CARRIERS

Referring to FIGS. 2, 3 and 6, when the automatic winder 1 starts to operate, the vertical shaft 19 rotates once for each passage of the winding unit 5 by the driving motion through the gear train including bevel gears, transversal shaft and vertical shaft (not shown). The rotation of the shaft 19 is transferred to the spur gear 13 through the spur gear 20, the inner wheel 18, pulley 16 and the spur gear 21 (referring to FIG. 6), while the above-mentioned rotation is transmitted to the spur gear 24 (referring to FIG. 3). Thus, when the spur gear 13 rotates, the vertical shaft 14, supporting the spur gear 13, rotates in the clockwise direction in FIG. 5, and the cop transferring circular disc 12 secured to the top portion of the vertical shaft 14 is rotated in the clockwise direction in FIG. 2, and the rotation of the spur gear 24 is transmitted to the rotating shaft 25 supporting the spur gear 24, and the friction disc 27 is rotated in the clockwise direction by the clockwise rotations of the spur gear 24. Consequently, when the stopper 36 is disengaged from the roller 38 (the reverse condition of the case shown in FIG. 6) the friction drive disc 29 is rotated by the friction clutch and the cop carrying plate 32 for carrying the cop container is rotated in the same direction as that of the disc 12. However, as the stopper 36 normally extends upwardly from the bottom plate 15 so as to engage with one of the four rollers 38 disposed at equal intervals under the friction drive disc 29, when the roller 38 becomes disengaged from the stopper 36, and the transferring plate 32 rotates a quarter turn, the pockets 31 formed in the transferring plate 32 are stopped at fixed positions in such a way that one of the pockets 31 is superimposed upon the cop outlet 83 disposed on the bottom plate 15.

OPERATION OF THE APPARATUS

Referring to FIGS. 1 and 2, when cops 3 produced by spinning machines and held in cop containers 4 are carried to the automatic cop supplying apparatus according to the present invention, the cop containers 4 supplied to the guide conduit 40 are conveyed, in the direction shown by an arrow *a* one by one to the circular disc 12 which is normally rotating. The cop containers 4 supported on the disc 12 are then carried forward along the guide plate 39, till each cop container comes to the position *b* in FIG. 1. When the pocket 31 of the cop carrying plates 32 coincide with the cop container 4, cop container 4 which as come to the position *b* is led positively into the guide pocket 31 and stops at the position *c*.

At the position *j* in FIG. 1, when the new cops are supplied to the respective winding units, after the above-mentioned supply motion, the cop carrier 58 starts to move as hereinafter described in detail while the carrying plates 32 and 32' rotate a quarter turn so that the cop container 4 contains the cop 3 and positioned at *d* in FIG. 1 is carried to the position *e*, meanwhile the empty cop carrier 58 moves to the position directly under the cop dropping outlet 83 corresponding to the position *e* just before the cop container 4 and waits for the arrival of the cops container 4. That is, when the operation for supplying the new cop 3 to the respective winding unit 5 is started, the solenoid 85 is actuated by electric current for a short time, so as to pull down the end portion 93 of the stopper 91 under the looped rail 56. The stopper 91 is normally projected outwardly from the looped rail 56 when the solenoid 85 is not actuated. The solenoid 85 is also actuated to pull the end portion of the stopper 36 from the upper surface of the bottom plate 15. The stopper 36 normally projects from the upper surface of the bottom plate 15 when the solenoid 35 is not energized. As mentioned above, when one of the cop carriers 58 reaches the position directly under the cop dropping outlet 83 to wait to receive the cop 3, the carrying plates 32 and 32' are rotated a quarter turn by the shaft 25 so that when the cop container 4 positioned at *d* in FIG. 1 is carried to the position *e*. Thereupon, the cop 3 drops through the cop dropping outlet 83 into the cop carrier 58 waiting under the outlet 83. In such a case, as the pulley 16 is rotated by the shaft 19, the steel belt 53 mounted on the pulleys 16, 49 and 50 is driven counterclockwise along with the cop carrier having the permanent magnet 69 that attracts the steel belt 53. When the top portion of the stopper 91 leaves the roller 94, the cop carrier 58 is free to move again. Consequently, the cop carrier 58 which contains a supplied cop 3 is carried to the position *f* by the revolution of the steel belt 53, and at the position *h*, the yarn retrieving motion is operated as hereinafter described. Meanwhile, the empty cop containers 4 are carried to the outlet by the rotation of the carrying plates 32 and 32' rotating clockwise, and then the empty cop containers 4 are led to the curved guide rods 42 and 42' disposed at the discharge portion of the cop container and are carried automatically to the spinning room by the discharging conduit 41 as shown by the direction *g* in FIG. 1.

When the cops 3, transferred to the cop carrier 58, are carried to the position *h* in FIG. 1, the beaters 113 and 114 disposed at both sides of the path of the cops work to loosen the tip bunch wound around the top portion of the cop 3 to loosen the tip bunch. That is, the beaters 113 and 114 rotate in the direction shown by the arrow in FIG. 17 by the driving transmission of the beater motor 96 through the reduction gear 104, shaft 100, the bevel gears 105 and 106, pulleys 108, 118, 119, 120 and 121. When the head portion of the cop 3 is led by the guide wires 116 and 117 to reach the area of the beaters 113 and 114, the tip bunch wound around the head portion of the cop is loosened. Since the suction nozzle 125 is disposed above the beaters 113 and 114 and opens its mouth downwardly, the loosened tip bunch is sucked into the nozzle 125 and the yarn end of the cop 3 is transferred to the suction box.

When the cop carrier 58 is carried over the position *e* in FIG. 1, the carrier 58 is carried freely in the direction shown by *f* without any interruption. The above-mentioned yarn-retrieving motion is performed at the position *h* when the cop carrier 58 turns around the corner where the pulley 50 is disposed. At this position, the path of the cap carrier 58 becomes parallel with the path of the winding unit 5 of the automatic winder 1, and the roller 66 of the cop carrier 58 rides on the oblique portion of the looped rail 56 at the position of *i* in FIG. 1. Consequently, the upper rollers 61, 62 and 65 turn the cop carriers 58 gradually counterclockwise (in FIG. 10) around the looped rail 56 which works as the fulcrum while changing its contacting position with the looped rail 56, thus, the cop supporting member 59 also inclines gradually. When the cop carrier 58 and cop supporting member 59 reach the position *i* in the above-mentioned condition, further movement of roller 94 mounted on the cop carrier 58 is obstructed by the stopper 173 as this is normally projected in the same position as that of the stopper 93. Further, the carrying speed of the cop carrier 58 is slightly greater than that of the winding unit 5 so as to obtain a high degree of accuracy in supplying cops to the winding units 5. When the cop carrier is waiting for the arrival of the winding unit 5 at the position *l* in FIG. 1 in the condition described above and the winding unit 5 arrives with a cop at the front portion of the cop carrier 58, an electric switch (not shown) is closed by the passage of the winding unit, whereby a solenoid (not shown) for operating the stopper 173 actuates to retract the stopper 173 from the looped rail 57 and the cop carrier 58 is displaced on the position *j* in FIG. 1 in such a way that the carrier 58 faces the winding unit 5 during the above-mentioned movement. As described above, when the carrier 58 arrives at the position *j* the angle of inclination of the cop supporting member 59 of the cop carrier 58 coincides with the angle of inclination of the peg 176 of the winding unit 5, which inclination of the peg 176 is provided in manner as is well known in the art of cop supplying machines, as shown in FIG. 18. The center line of the cop supporting member 59 coincides with the center line of the peg 176, moreover the top end portion of the peg moves adjacent to the trap door 71 of the cop supporting member 59. On the other hand, the yarn end $Y_1$ transferred to the knot-tier 128 and the yarn end $Y_2$ of the cop already transferred to the suction box are united by the knot-tier 128 at the *j* position. That is, when the winding unit 5 arrives at the position *j* the piston rod 135 moves downwardly by air supplied from the air supply pipe 142 of the air cylinder 132. At the lowest position of the piston rod 135, when the screw 134 of the lifting plate 133 fixed on the piston rod 135 contracts the knotter trip lever 131 disposed the clamp lever 130 of the knot-tier 128, the clamp lever 130 turns clockwise, as shown in FIG. 18 and the stop piece 151 fixed downwardly on the clamp lever 130 leaves the clutch wheel 149. Consequently, the rotation of the knotter motor 144 which is normally rotating is transmitted to the clutch wheel 149 through a transmission means comprising the pulley 145, the timing belt 147, pulley 146, pinion 148, and intermediate wheel 150, etc., actuating the knotter-bill (not shown). On the other hand, as the yarn guide 140 is moved downwardly by the downward movement of the lifting plate 133, the yarn end $Y_1$ of the package side is positively led to the under surface of the up-down plate 141 by the motion of the yarn guide 140. The above-mentioned uniting or tying motion of the yarns is operated during one rotation of the clutch wheel 149. Further, when the clutch wheel 149 rotates once, the stopper piece 151 once again engages the clutch wheel 149 so as to stop the rotation of the clutch wheel 149. The electric circuit of the limit switch 133 is closed by the downward movement of the operating pin 139 which moves with the lifting plate 133 and the setting condition of the magnetic valve is changed-over whereby the piston rod 135 is lifted upwardly supplying air through the air supply pipe 143 of the air cylinder 132 and the yarn guide 140 is returned to its normal or original position to wait for the next knot-tying operation.

During the above-mentioned knot-tying operation, the cop carrier 58 is carried together with the winding unit 5 to the position *k* and at the *k* position the cop 3 of the carrier 58 is transferred to the peg 176 of the winding unit 5. That is, the angle of inclination of the cop-supporting member 59 of the cap carrier 58 at the position *k* is maintained at the position *j* by the straight lined portion 78 of the looped rail 57, consequently, the center line of the cop supporting member 59 coincides with the center line of the peg 176. At the position *k*, the guide rail 73 of the trap door 71 is cut off as shown in FIG. 2, the trap door 71 is opened by the weight of the cop 3 supported in the member 59 and the cop 3 is transferred to the peg 176 in such a way that the peg 176 is inserted into the cop 3. Further, a cut groove 177 is formed at the central portion of the trap door 71 so as to permit the passing of the head portion of the peg 176 (referring to FIG. 8), thus, the head portion of the peg 176 does not obstruct the downward turning motion of the trap door 71.

When the yarn end of the cop 3 is being united with the yarn end of the package, and when the cop whose above-mentioned knot-tying is completed is transferred to the peg 176 successively, as the cam 168 mounted on the vertical shaft 19 rotates once with each passage of the winding unit 5 the shutter plate 156 is displaced towards the left as seen in FIG. 21 by the turning motion of the curved lever 155. The curved lever 155 is actuated by the projected portion 168*a* of the cam 168 and the aperture 167 formed in the shutter plate 156 is displaced in the right upper position of the air discharge compartment 158, consequently the compartment is connected with the air discharge compartment 158 and the nozzle facing the front portion of the knot-tier 128 becomes a suction nozzle and the yarn of the cop side which has a tendency to become loose at a position adjacent to the knot-tier 128, is sucked into the nozzle 152 thereby preventing snarling of the yarn during the operation of the knot-tying and the bobbin chuting of the cop 3 into the peg 176. After the above-mentioned operation, the curved lever 155 turns counterclockwise by the action of the cavity portion 168*b* of the cam 168*b* of the cam 168, the shutter plate 156 is displaced to the right and the aperture 167 formed in the shutter plate 156 is moved to a position over the air supply compartment 157. Consequently, the air supply compartment 157 is connected with the spaced compartment 160 and the nozzle 152 becomes an air jet nozzle, thereby the yarn wastes entangled on the portion adjacent to the knot-tier 128 are removed.

As the motion of the cop carrier 58 which supplied the cop 3 to the winding unit 5 is not disturbed, the carrier 58 is carried to the right as seen in FIG. 2 by the rotation of the steel belt 53 in such a way that the trap door 71 remains open while the carrier 58 is carried to the position *k* in FIG. 1 where the guide rail 73 is omitted. However, when the carrier arrives at the position *e* in FIG. 1 where the guide rail 73 is positioned again as illustrated already, the trap door 71 is gradually closed by the action of the cam 81 of the starting portion of the guide rail 73 and returns to its original closed position before arriving at the position *e* in FIG. 1. When the carrier arrives at the position *e* the carrier 58 returns to its waiting condition for receiving the new cop 3.

What we claim is:

1. An automatic method for supplying cops having a tip bunch without backwind to a plurality of travelling winding units of an automatic winder, comprising in combination the steps of, carrying cop containers each containing a single cop to a predetermined position one by one; successively transferring cops from said cop containers into cop carriers awaiting at a position under said predetermined position while said cop container is aligned with said cop carrier; moving said cop carriers successively along a looped passage; retrieving a yarn end of said cop contained in each cop carrier and a yarn end of a package mounted on a respective winding unit facing said cop carrier while moving said cop carriers along said looped passage and while said winding units are travelling over a predetermined path; uniting said retrieved yarn ends of said cop and said package of said winding unit; superimposing said cop carrier over a cop receiving peg of said respective winding unit while said cop carrier is moving along a predetermined portion of said looped passage;

transferring the cop from said superimposed cop carrier to said cop receiving peg of said respective winding unit while superimposing said cop carrier over said cop receiving peg of said winding unit; and moving said cop carriers after completion of transferring cops to said respective winding units to said predetermined position for successively receiving cops from said cop containers.

2. An automatic method for supplying cops to travelling winding units of an automatic winder according to claim 1, further comprising the step of loosening said tip bunch of said cops contained in said cop carriers while moving said cop carriers along said looped passage prior to retrieving a yarn end from said cop.

3. An automatic method for supplying cops to a plurality of travelling winding units of an automatic winder; comprising in combination the steps of carrying a plurality of cop containers each containing a single cop successively to pockets of an intermittently rotating cop carrying plate one by one; carrying said cop containers in said pockets of said cop carrying plate to a superimposed position over an awaiting position of a plurality of cop carriers moving along a looped passage by said intermittent rotation of said cop carrying plate; transferring a cop from said cop container into said cop carrier at said awaiting position when said cop container arrives at said superimposed position; moving said cop carriers successively along said looped passage; retrieving a yarn end of said cop contained in said cop carrier and a yarn end of a package mounted on a respective winding unit facing said cop carrier while moving said cop carriers along said looped passage and while said winding units are travelling along a predetermined path; uniting said retrieved yarn ends of said cop and said package of said winding unit; superimposing said cop carrier over a cop receiving peg of said respective winding unit while said cop carrier is moving along a predetermined portion of said looped passage; transferring said cop from said superimposed cop carrier to said cop receiving peg of said winding unit while superimposing said cop carrier over said cop receiving peg of said winding unit; and moving said cop carriers after completion of transferring cops to said respective winding units to said predetermined position for successively receiving cops from said cop containers.

4. An automatic method for supplying cops to travelling winding units of an automatic winder according to claim 1, further including regulating the superimposed position of said cop carrier over said cop receiving peg of said winding unit by means of a control action of control means for regulating said superimposed position.

5. An automatic method for supplying cops to travelling winding units of an automatic winder according to claim 1, further comprising the step of rotating said cop in an unwinding direction while retrieving said yarn end from said cop.

6. Apparatus for supplying cops having tip bunch without backwind to an automatic winder having a plurality of winding units travelling along a predetermined path, comprising in combination, means for carrying cylindrical cop containers each containing a single cop successively to a predetermined transferring position, a plurality of cop carriers movable along a looped passage including a transferring position corresponding to said transferring position of said cop containers, means for moving said cop carriers successively along said looped passage including means for bringing said cop carriers successively to said transferring position, means for successively transferring cops from said cop containers to said cop carriers at said transferring position, means for discharging empty cop containers, means for retrieving a yarn end from said cop contained in said cop carrier and a yarn end from a package mounted on a respective winding unit facing said cop carrier, said retrieving means being located on said looped passage, a knot-tier for uniting said retrieved yarn ends, means for successively superimposing said cop carriers in a predetermined position of said looped passage over cop receiving pegs of respective winding units, means for transferring a cop from each said cop carrier to the receiving peg of the respective winding unit while said cop carrier is superimposed over said peg, and means for thereafter returning said cop carriers to said predetermined transferring position.

7. Apparatus for supplying cops to travelling winding units of an automatic winder according to claim 6, wherein said means for transferring cops from said cop containers into said cop carriers comprises an intermittently rotating cop container carrying plate having a plurality of pockets symmetrically spaced in a circumferential portion of said carrying plate, a circular disc disposed under said cop container carrying plate and having an aperture for permitting the passage of cops from said cop containers to said cop carriers successively positioned at said transferring position and driving means for intermittently rotating said cop container carrying plate by the spacing of said pockets.

8. Apparatus for supplying cops to travelling winding units of an automatic winder according to claim 7, wherein said means for carrying said cylindrical cop containers to pockets of said cop container carrying plate comprising a circular disc horizontally disposed at a position under said cop container plate in such a way that a passage of said pockets of said rotating cop container carrying plate is superimposed upon an edge portion of said circular disc having a width corresponding to the diameter of said cop containers, means for guiding cop containers to said edge portion of said circular disc and drive mechanism for rotating said circular disc toward the pockets of said cop container carrying plate.

9. Apparatus for supplying cops to travelling winding units of an automatic winder according to claim 6, wherein each said cop carrier has a trap door disposed at its bottom.

10. Apparatus for supplying cops automatically to travelling winding units of an automatic winder according to claim 9, wherein said means for transferring cop from said cop carrier to said cop receiving peg of said winding unit comprising means for opening said trap door of said cop carrier, said opening means comprising a cam surface of a guide rail contacting a bottom portion of said trap door as said cop carrier is moved along said looped passage.

11. Apparatus for supplying cops to travelling winding units of an automatic winder according to claim 6, further comprising means for loosening said tip bunch of said cops positioned along said looped passage ahead of said yarn end retrieving means.

12. Apparatus for supplying cops automatically to travelling winding units of automatic winder according to claim 11, wherein said means for loosening said tip bunch of said cops comprises a pair of beaters disposed along the passage of head portions of said cops carried by said cop carrier in such position that said head portions of cops pass between said beaters.

13. Apparatus for supplying cops automatically to travelling winding units of an automatic winder according to claim 12, wherein said means for loosening tip bunch of said cops further includes means for rotating said cops in an unwinding direction of said cops, said rotating means comprising a rotating belt disposed at a position for contacting with a bottom portion of said cops while carried by cop carriers.

14. Apparatus for supplying cops to travelling winding units of an automatic winder according to claim 6, wherein said means for moving said cop carriers along said looped passage comprising a pair of steel endless belt positively driven by a power transmitting means of said apparatus, brackets positively attracted to said steel belts by a magnet member disposed in each said bracket, each said cop carrier being mounted on each said bracket, a pair of guide rails disposed along said steel belts, said guide rails being disposed in a parallel relation to passage of winding units of said winding machine for a predetermined portion of said loop passage to superimposed said cop carriers over cop receiving pegs of said winding units respectively.

15. Apparatus for supplying cops to travelling winding units of an automatic winder according to claim 14, comprising means for stopping said cop carriers at said transferring position comprising a stopper disposed at said transferring position, a solenoid for controlling the position of said stopper between a position receded from said looped passage of said cop carrier to a position beyond from said looped passage of said cop carrier whereby when said stopper is projected beyond said looped passage of said cop carrier, said cop carrier is stopped by said stopper and slides on said steel belts till a cop container arrives at the transferring position over said cop carrier and a cop is dropped into said waiting cop carrier.

16. Apparatus for supplying cops to travelling winding units of an automatic winder according to claim 14, comprising means for synchronizing movement of said cop carriers with that of respective winding units in that portion of said looped passage in which said cop carriers are superimposed over pegs of respective winding units.

17. Apparatus for supplying cops automatically to travelling winding units of an automatic winder according to claim 16, wherein said means for synchronizing movement of said cop carriers with that of respective winding units, comprising a stopper disposed along the passage of said cop carriers, said stopper normally interrupting further movement of said cop carriers with said steel belts, electrical means for changing the position of said stopper in such a way that when a winding unit without a cop arrives at the position for supplying a cop, said electrical means actuates to said stopper to withdraw it from the passage of said cop carrier to permit free passage of said cop carrier stopped at the position of said stopper.

18. Apparatus for supplying cops automatically to travelling winding units of an automatic winder according to claim 14, wherein said pair of guide rails are provided with obliquely curved portions for tilting said cop carriers so as to align said cop carriers with a cop receiving peg of a respective winding unit until said cop transferring operation is completed.

19. Apparatus for supplying cops automatically to travelling winding units of an automatic winder according to claim 1, comprising a snarl-preventing means applying suction air to the yarn at a position adjacent said knot-tier.

References Cited

UNITED STATES PATENTS

| | | | |
|---|---|---|---|
| 2,350,927 | 6/1944 | Reiners et al. | 242—35.5 |
| 2,600,793 | 6/1952 | Molloy | 242—35.5 |
| 2,675,971 | 4/1954 | Abbott | 242—35.6 |
| 3,111,280 | 11/1963 | Reiners et al. | 242—35.5 |
| 3,154,904 | 11/1964 | Furst | 242—35.5 X |
| 3,224,694 | 12/1965 | Isao Oishi | 242—35.5 |
| 3,279,710 | 10/1966 | Raasch | 242—35.5 |
| 3,154,904 | 11/1964 | Furst | 242—35.5 X |
| 3,281,088 | 10/1966 | Isamu Matsui et al. | 242—35.6 |
| 3,295,775 | 1/1967 | Raasch et al. | 242—35.5 |

S. N. GILREATH, Primary Examiner